Figure 1:
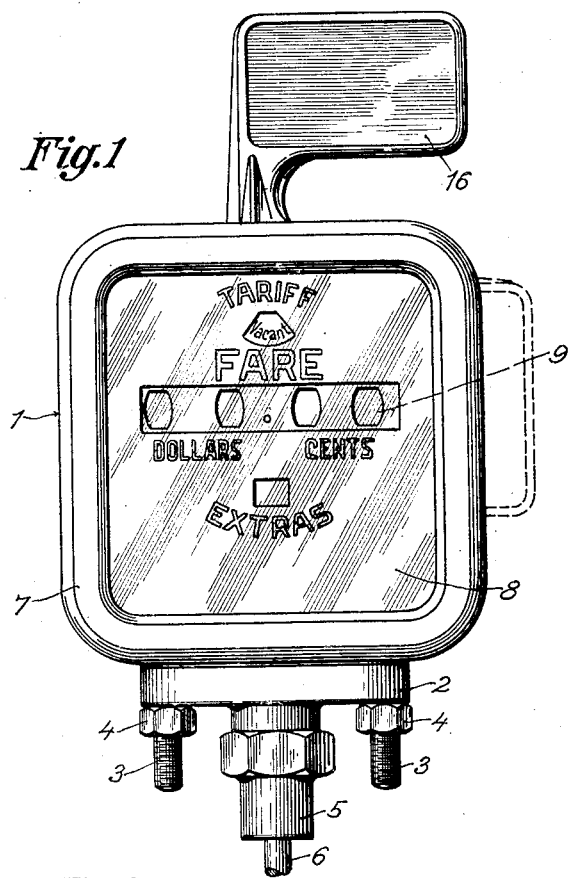

May 3, 1932.  P. RIEGGER  1,856,403

FARE INDICATOR

Filed Nov. 5, 1926  8 Sheets-Sheet 1

Inventor:
Paul Riegger
by Lorka, Kehlenbeck & Farley
Attorneys

May 3, 1932.  P. RIEGGER  1,856,403
FARE INDICATOR
Filed Nov. 5, 1926   8 Sheets-Sheet 2
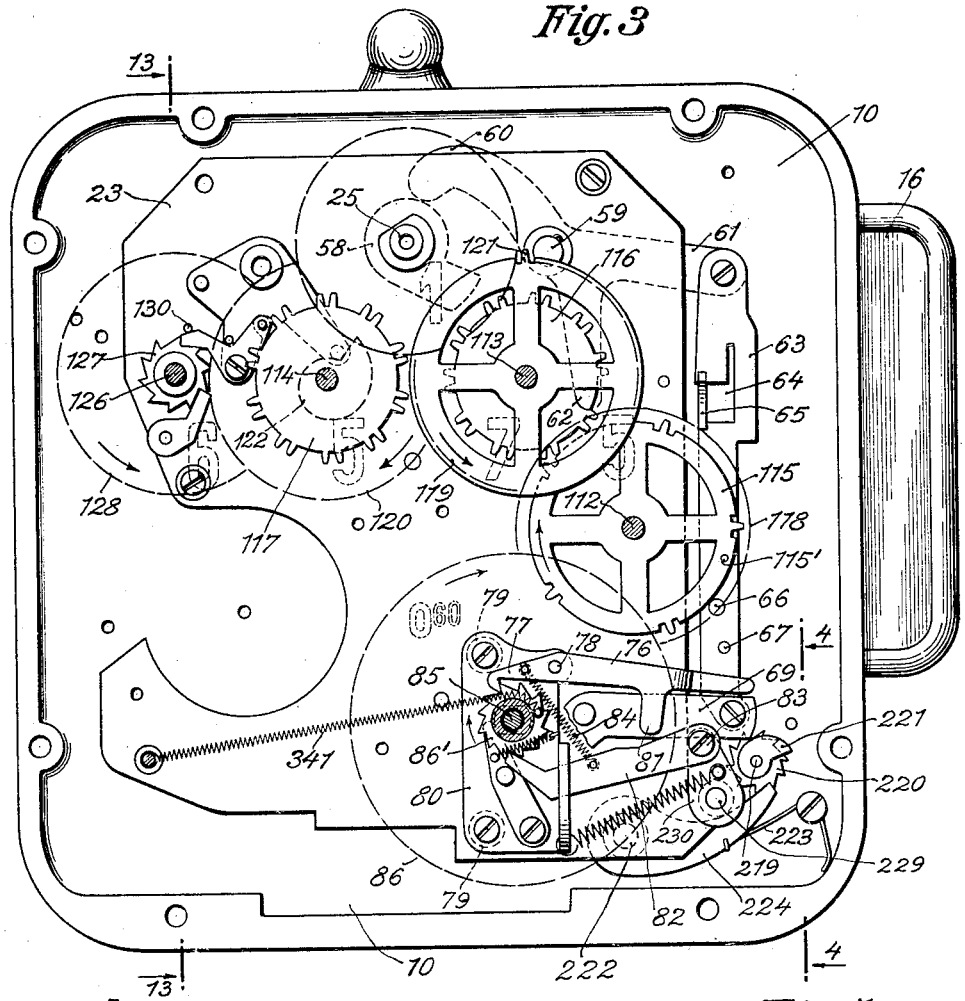
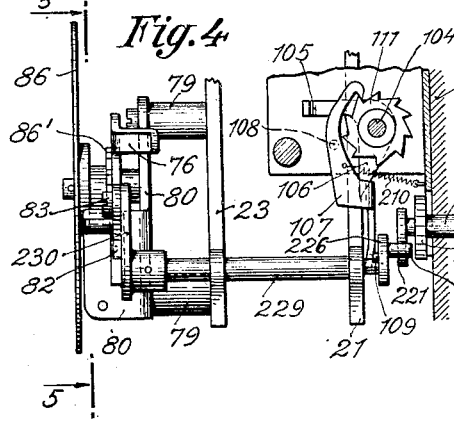
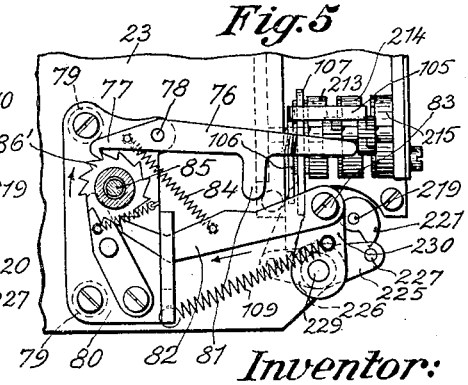
Inventor:
Paul Riegger
by Lotka, Kellenbeix & Farley
Attorneys Inventor:
Paul Riegger
by Locke, Kellenbeck & Farley
Attorneys May 3, 1932. P. RIEGGER 1,856,403
FARE INDICATOR
Filed Nov. 5, 1926 8 Sheets-Sheet 4
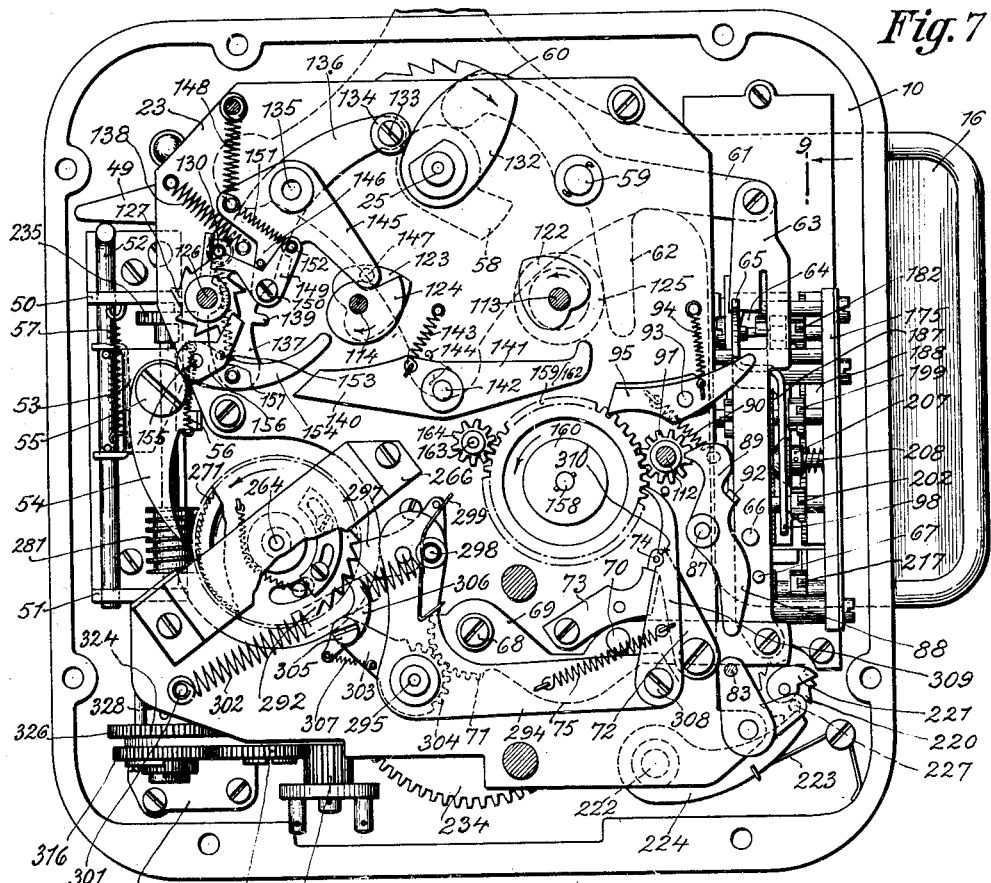
Fig. 7
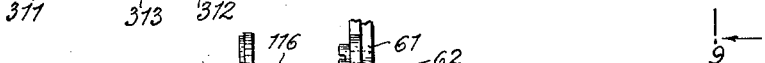
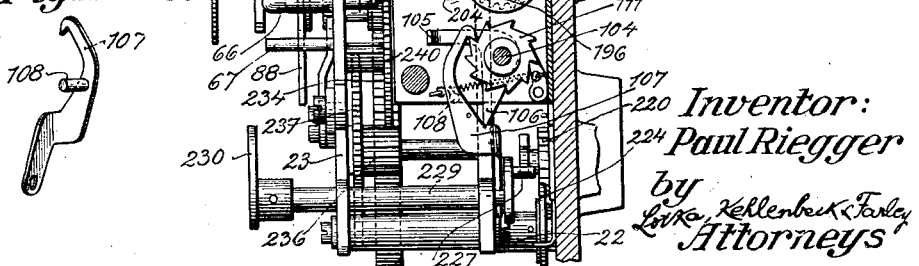
Fig. 11
Fig. 12
Fig. 9
Inventor:
Paul Riegger
by Luka, Kehlenbeck & Farley
Attorneys May 3, 1932.   P. RIEGGER   1,856,403
FARE INDICATOR
Filed Nov. 5, 1926   8 Sheets-Sheet 5
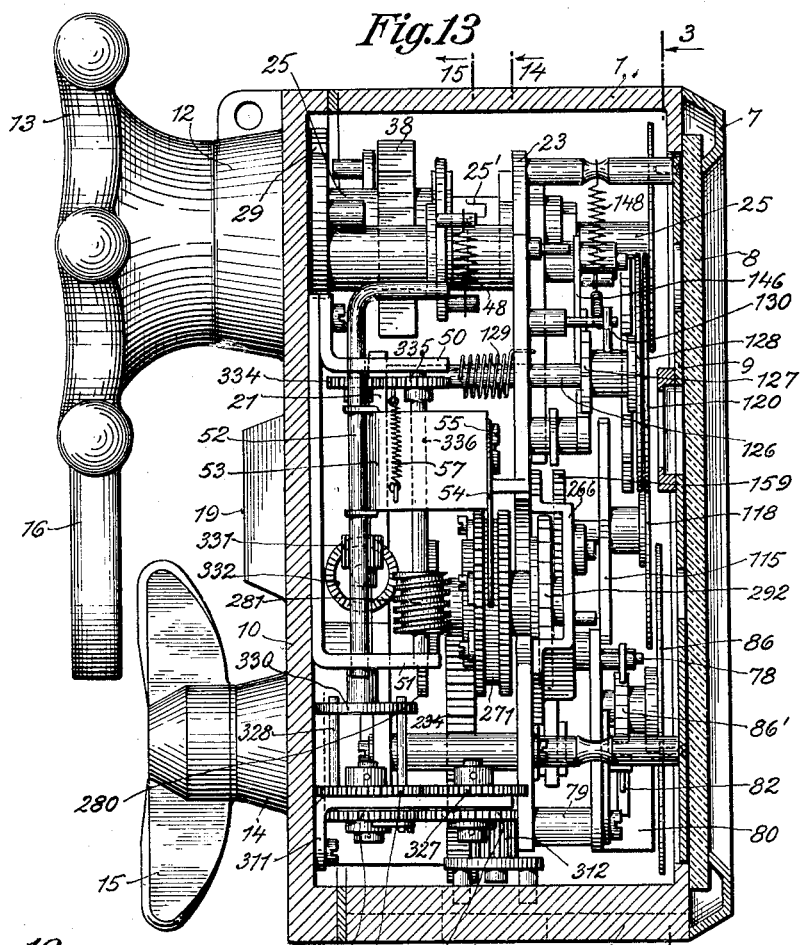
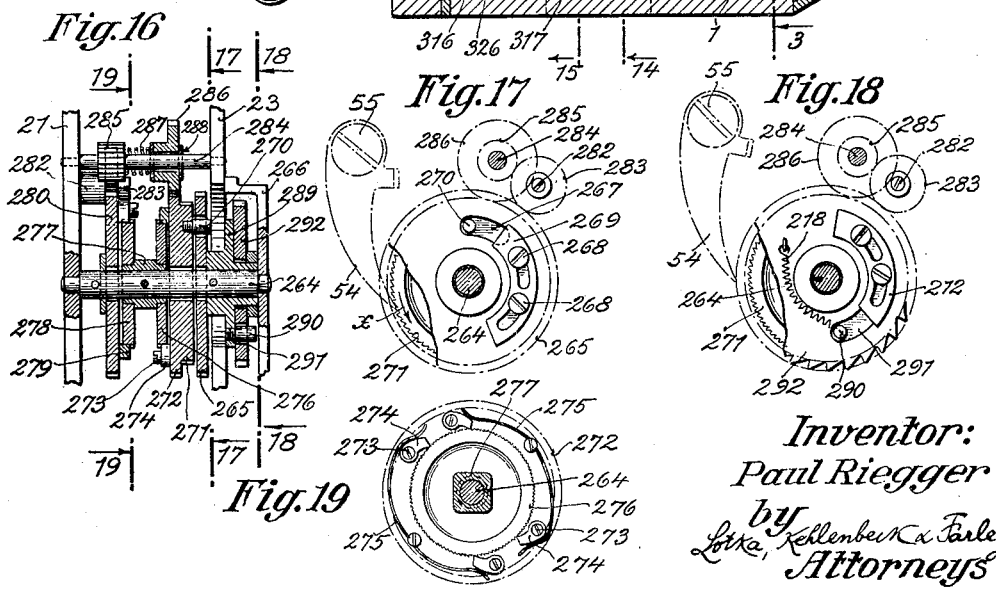
Inventor:
Paul Riegger
by Lotka, Kellenbeck & Farley
Attorneys May 3, 1932.   P. RIEGGER   1,856,403

FARE INDICATOR

Filed Nov. 5, 1926   8 Sheets-Sheet 6

Inventor:
Paul Riegger
by Lotze, Kehlenbeck & Farley
Attorneys

May 3, 1932.  P. RIEGGER  1,856,403
FARE INDICATOR
Filed Nov. 5, 1926   8 Sheets-Sheet 7
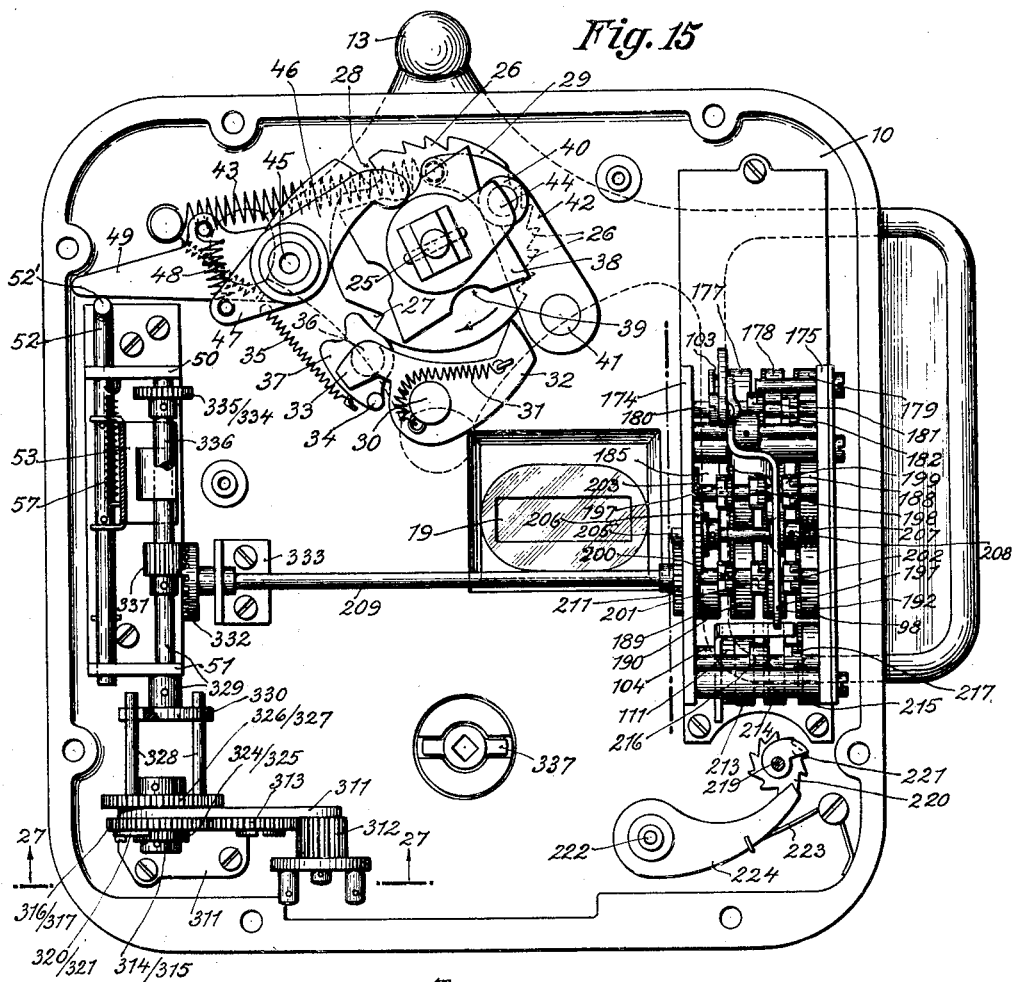
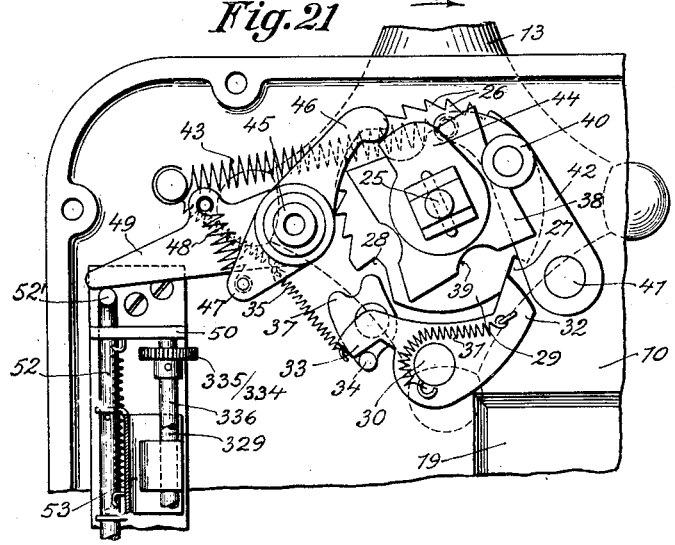
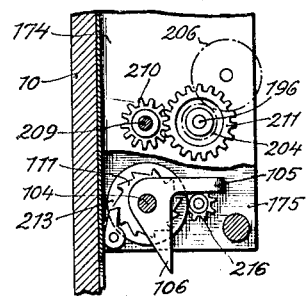
Inventor:
Paul Riegger
by Locka, Kellenbeck & Farley
Attorneys May 3, 1932.  P. RIEGGER  1,856,403
FARE INDICATOR
Filed Nov. 5, 1926   8 Sheets-Sheet 8

Inventor:
Paul Riegger
by Louka, Kehlenbeck & Farley
Attorneys

Patented May 3, 1932

1,856,403

UNITED STATES PATENT OFFICE

PAUL RIEGGER, OF VILLINGEN, BADEN, GERMANY, ASSIGNOR TO KIENZLE UHRENFAB-
RIKEN AKTIENGESELLSCHAFT, OF SCHWENNINGEN-ON-THE-NECKAR, GERMANY,
A CORPORATION OF GERMANY

FARE INDICATOR

Application filed November 5, 1926, Serial No. 146,361, and in Germany September 22, 1926.

My invention relates to improvements in fare indicators, and the object of the improvements is to provide a fare indicator in which the whole mechanism may be removed from the casing enclosing the same together with the lid. With this object in view my invention consists in disposing the whole mechanism connected with the fare indicating disks and the registering drums on two plates mounted by means of pillars on the lid of the casing. Thereby the mechanism can be readily mounted on the plates, and it can be readily repaired and cleaned, because after removing the lid and the mechanism from the casing and disconnecting the plates from the lid all the parts are accessible. Further, the controlling arm or flag staff is in loose engagement with the shaft controlling the mechanism, and in a similar way other operating or controlling members such for example as a handle connected with the arbor of the spring barrel of the clock mechanism are mounted so that they can be readily disconnected from the parts controlled thereby. Another object of the improvements is to provide an indicator in which the movement of the shaft connected with the wheel of the vehicle is transmitted to the driving shaft of the odometer registering the length of way made by the vehicle by means of a crown gear.

Further, the invention relates to the connection between the odometer registering the aggregate length of the drives made by the vehicle and the odometer registering the length of way made by the employed vehicle, and the object of the improvements is to provide a gear wheel intermediate the said odometers which is adapted to be thrown into and out of coupling position by means of a cone controlled by a lever connected with the said controlling arm or flag staff. Thus the said odometer registering the aggregate length of way of the employed vehicle is automatically thrown into and out of operation upon operation of the flag staff.

In fare indicators of the class referred to the fare indicating disks are rotated only after a certain initial drive or, in case of the indicating disk registering time, after a certain initial period of time, the said disks displaying, in the initial positions, a certain minimum charge. In my improved construction the mechanisms connected with the said disks are thrown into operation after the mechanisms connected respectively with the wheel of the vehicle and the clock work of the indicator have performed a certain dead movement. In the preferred construction the dead movement of the driving part of the mechanism is brought about by connecting the same with the driven part by means of a pin and slot connection, the pin connected with the driving part moving through the said slot and engaging the driven part when arriving at the end of the said slot. Ordinarily the charge made for having the vehicle wait is smaller than the cost of the drive, and accordingly the initial charge for waiting is smaller than the initial charge for making a drive. Therefore I dispose the said pin and slot connections in series, so that when operating the fare indicating disk from the clock work, both pin and slot connections are included in the mechanism, the part of the mechanism connected with the clock work bringing at first one pin and slot connection and thereafter the other pin and slot connection into driving engagement. From this it results that the initial waiting time, for which the minimum charge is made, is about twice as long as that required for the traversing of the initial distance. The length of the slots of the pin and slot connections can be varied for example by means of slides enlarging or reducing the length of the slots.

Other objects of the improvements will be understood from the following description.

For the purpose of explaining the invention an example embodying the same has been shown in the accompanying drawings, in which the same letters of reference have been used in all the views to indicate corresponding parts. In said drawings, Fig. 1 is an elevation of the fare indicator looking from the front side thereof, the controlling member or flag being in zero position.

Figure 2:
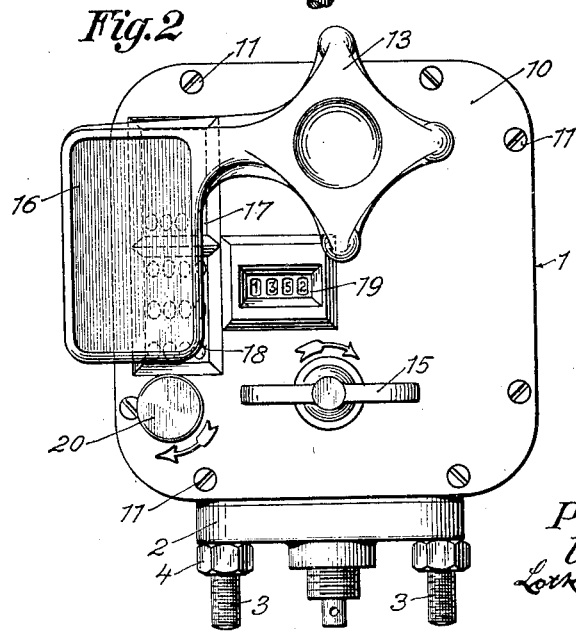
Figure 6:
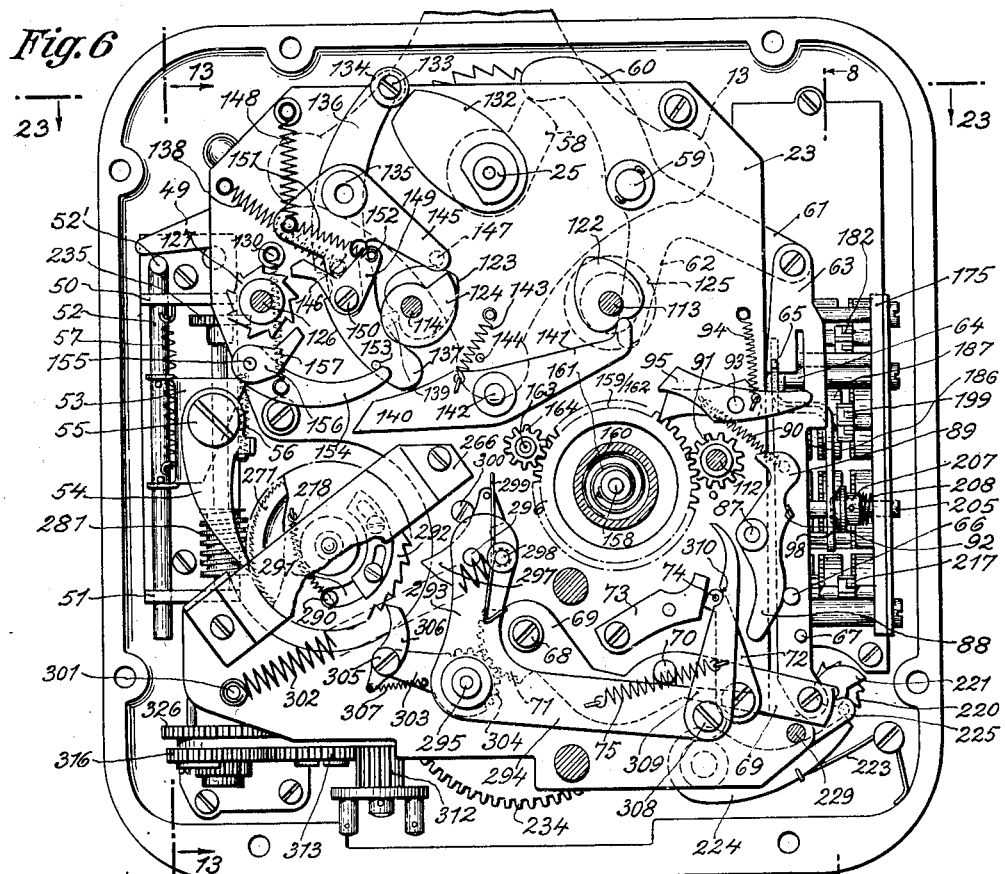
Figure 8:
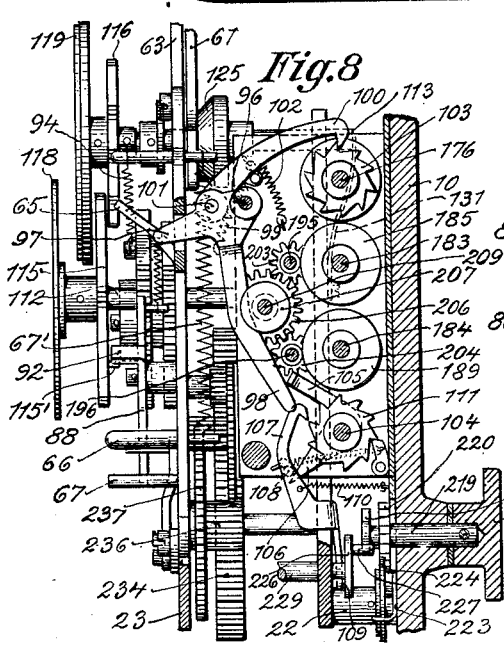
Figure 10:
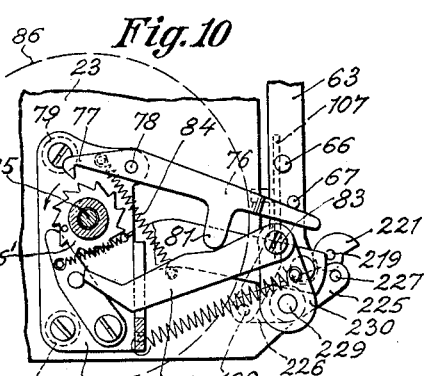
Figure 14:
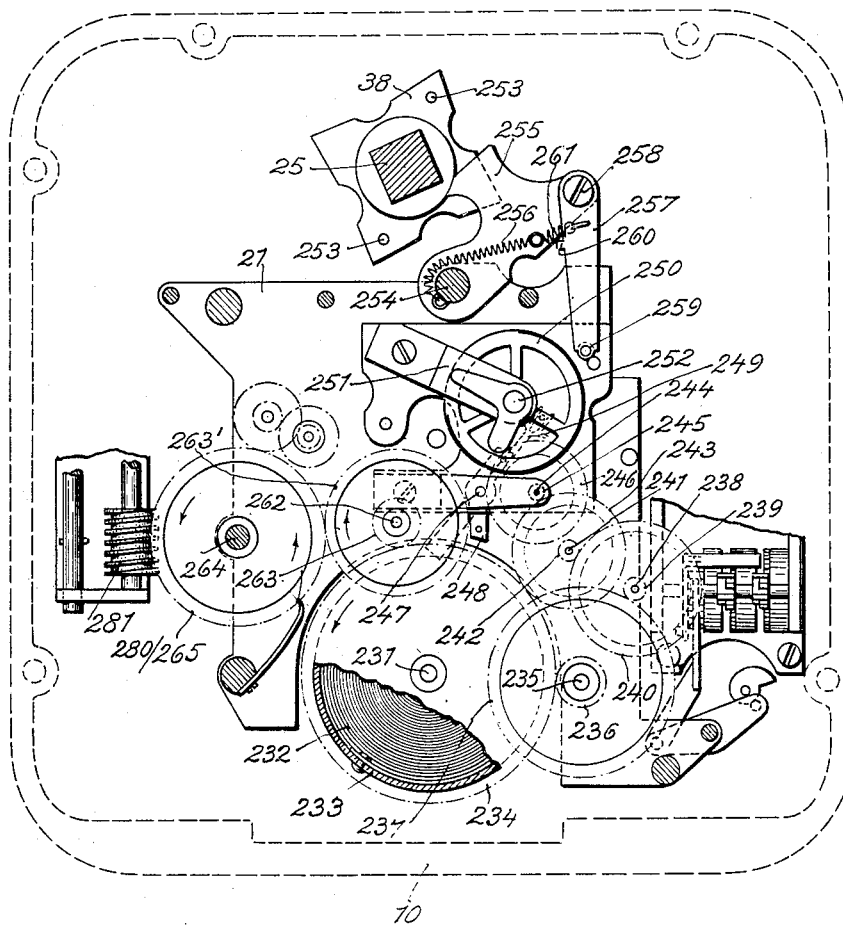
Figure 20:
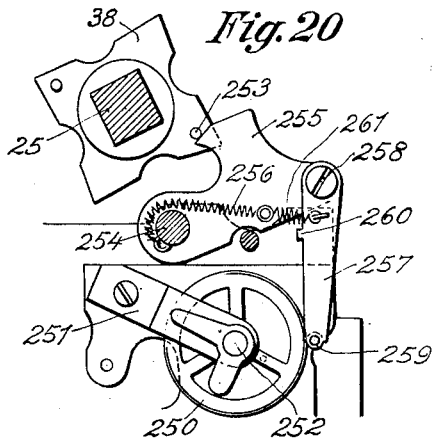
Figure 27:
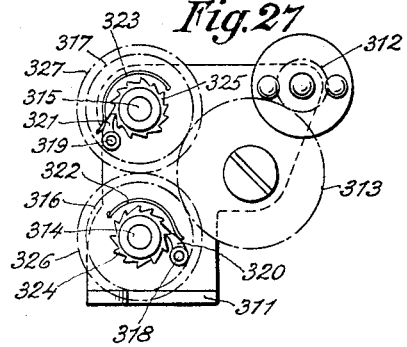
Figure 23:
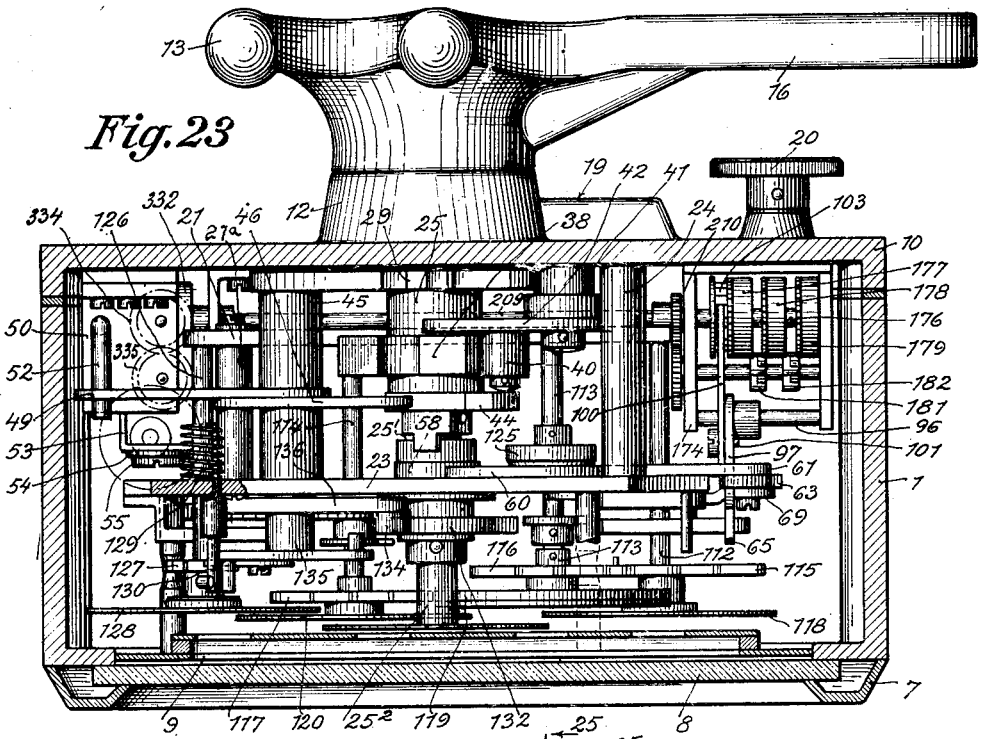
Figures 24, 25:
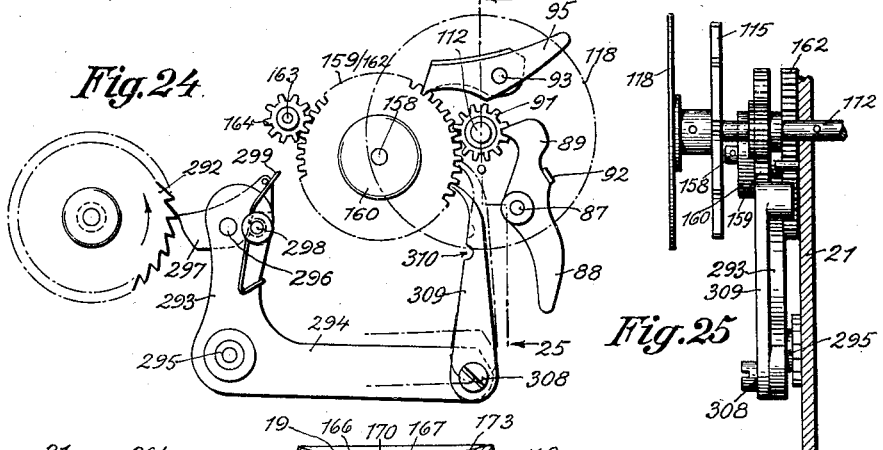
Figure 26:
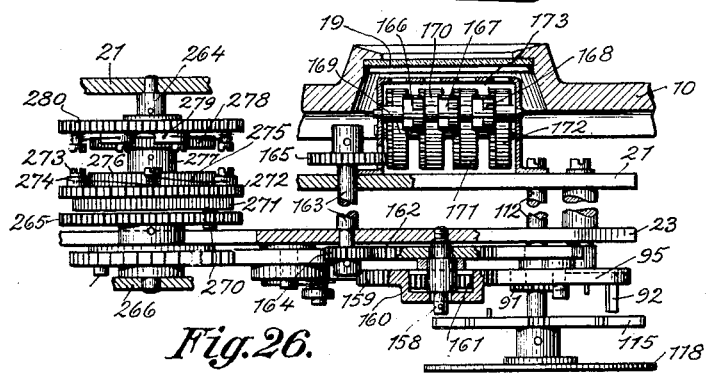

Fig. 2 is a rear elevation of the fare indicator, the controlling member or flag staff being in the first fare indicating position I, Fig. 3 is an elevation on an enlarged scale looking from the front side of the fare indicator, the casing being removed from the lid for displaying the fare indicating disks and other parts mounted on the front plate of the frame supporting the mechanism, Fig. 4 is a detail view showing a part of Fig. 3 and looking in the direction of the arrows 4—4 of the said figure, Fig. 5 is a sectional elevation taken on the line 5—5 of Fig. 4 and looking in the direction of the arrows, Fig. 6 is an elevation of the fare indicator with the casing removed from the lid and the mechanism, the controlling member or flag being in the zero position, Fig. 7 is a similar elevation showing the controlling member or flag in the fare recording position I and at right angles to the position shown in Fig. 6, Fig. 8 is a sectional elevation taken on the line 8—8 of Fig. 6, Fig. 9 is a sectional elevation taken on the line 9—9 of Fig. 7, Fig. 10 is an elevation showing certain parts omitted from Fig. 7 in detail, Figs. 11 and 12 are perspective detail views showing two members connected with the drum for recording extra charges, Fig. 13 is an elevation of the fare indicator mechanism looking from the left in Fig. 6, the casing and lid being shown in section taken on the line 13—13 of the said figure, Fig. 14 is a sectional elevation taken on the line 14—14 of Fig. 13 and looking in the direction of the arrows, Fig. 15 is a sectional elevation taken on the line 15—15 of Fig. 13 and looking in the direction of the arrows, Fig. 16 is a detail sectional view showing a part of the operating mechanism for the fare indicating disks, Figs. 17, 18 and 19 are sectional elevations taken respectively on the lines 17—17, 18—18 and 19—19 of Fig. 16, Fig. 20 is an elevation showing the parts controlled by the controlling shaft or flag staff for arresting or releasing the clock mechanism, Fig. 21 is an elevation showing a part of Fig. 15, the controlling arm and the members of the mechanism being in different positions, Fig. 22 is a detail view showing a part of the mechanism connected with the odometer, Fig. 23 is a top-plan view of the fare indicator with the casing shown in section taken on the line 23—23 of Fig. 6, Fig. 24 is a detail view showing the operating mechanism directly connected with one of the fare indicating disks, Fig. 25 is a sectional elevation taken on the line 25—25 of Fig. 24, Fig. 26 is a top-plan view of the mechanism shown in Figs. 24 and 25, and Fig. 27 is a detail view showing the mechanism for transmitting the movement of the vehicle wheel to the operative parts of the indicating mechanism.

In the example shown in the figures the main parts of the fare indicator are the following: The odometer comprising drums 177, 178 and 179 on which the aggregate number of the trips made by the vehicle is registered, drums 185 to 188 indicating the aggregate length of way made by the employed vehicle, and drums 189 to 192 on which the aggregate length of way made by the employed and unemployed vehicle is recorded, the said mechanism being shown in Figs. 9 and 15. The said odometer is operated from a wheel of the vehicle through the intermediary of a spur gear 312, a crown gear 331, 332 and a shaft 209. Second, the fare indicating disks 118 to 120 and a series of registering drums 169 to 172 for registering the total fare, the said parts being best shown in Figs. 3, 9, 23 and 26. The fare indicator is likewise operated from a vehicle wheel through the intermediary of the spur gear 312, a worm gearing 281, 280 and the mechanism shown in Figs. 24 to 26. Third, a clock mechanism represented by the balance wheel 250 and the spring barrel 233 and its spring 232, the said clock mechanism being connected through the intermediary of spur gears 234 and gear wheels 263, 263' and 265 with the said mechanism shown in Fig. 26. Fourth, means for recording extra charges, represented in Figs. 3, 4 and 5 by a ratchet wheel 111 and by registering drums 213, 214 and 215 adapted to register the said extra charges. The mechanism for recording the extra charges is controlled by a rotary button 20 located outside the casing and connected with the said mechanism by a shaft 219. Suitable controlling mechanism is provided for setting the said parts in the different positions, and the said controlling mechanism comprises a controlling shaft 25 connected with a flag 16.

The casing 1 enclosing the operative parts of the fare indicator is formed at its bottom with a pad 2 equipped with screw-bolts 3 and nuts 4 for securing the indicator to a suitable part of the vehicle. The pad 2 is formed with a tubular extension 5 providing a bearing for a rotary shaft 6 connected with a rotary part of the vehicle such as a wheel and coupled at its inner end with the driving mechanism comprising the spur gear 312.

The bottom of the casing 1 is provided by a glass plate 8 fixed to the casing by means of a metallic ring 7 (Figs. 1 and 13). At the rear of the glass plate there is a plate 9 having certain indications, such as tariff, fare, dollars, cents, and extras printed thereon, which indications can be read through the glass plate 8.

The casing 1 is closed by means of a lid 10 fixed in position by means of screws 11, and it is provided with a lug 12 formed with a bore providing a bearing for a handle 13 carrying the flag 16, and a lug 14 providing a bearing for a wing nut 15 (Figs. 2 and 13). The flag 16 carries the word "vacant" which is displayed in the position shown in Fig. 1. Further, the lid 10 is formed with three peep holes 17, 18 and 19 closed by means of glass plates and displaying the figures shown by the registering and indicating members of the indicator (Fig. 2). Below the windows 17 and 18 there is the rotary button 20 above referred to.

At a distance from the inner surface of the lid 10 is a plate 21 supported by pillars 22 fixed to said lid. A second plate 23 parallel to the plate 21 is held in spaced relation to the latter partly by means of pillars 24 fixed to the lid and approximately three times as long as the pillars 22, and partly by means of pillars 21$^a$ fixed to the plate 21 (Fig. 23).

The handle 13 is fixed to one end of the shaft made in two sections 25 and 25$^2$ connected with each other by coupling means 25$^1$. The shaft section 25 is mounted in the lug 12, and the section 25$^2$ in a bore of the plate 23.

Near the lid 10 of the casing a disk 29 is secured to the shaft 25, which disk is formed about a part of its circumference with teeth 26 and notches 27 and 28 (Fig. 15), and which is engaged at its circumference by a pawl 32 rockingly mounted on a bolt 30 and acted upon by a spring 31 tending to hold the same in engagement with the disk. The pawl is made integral with a heel 33 adapted for cooperation with a pin 34 projecting from a locking pawl 37 rockingly mounted on a bolt 36 and acted upon by a spring 35. The object of the disk 29 and the pawls 32 and 37 is to lock the shaft 25 in the initial position shown in Fig. 1, and to release the same in the manner to be described hereinafter.

Adjacent to the disk 29 a disk 38 is secured to the shaft 25, which is substantially rectangular in form, and which is formed at the middle of its sides with notches 39 adapted to be engaged in the four positions of the handle 13 by a roller 40 provided on a lever 42 rockingly mounted on a bolt 41, a strong spring 43 connected to the lever 42 tending to hold the roller 40 in engagement with one of the notches 39 and thus to lock the disk 38 and the controlling shaft 25, 25$^2$ in the set positions. Thus the disk 38 and the lever 42 provide a second locking mechanism for the controlling shaft.

Adjacent to the disk 38 a cam 44 is fixed to the shaft 25 (Fig. 15), and the said cam is engaged by one of the arms of a lever 46, 47 rockingly mounted on a bolt 45. On the said bolt a lever 49 is rockingly mounted, which is yieldingly connected with the lever 46, 47 by means of a spring 48 (Figs. 15, 21 and 23). The lever 49 is in position for acting on an arm 52' of a rod 52 slidably mounted in brackets 50 and 51. Between the said brackets an arm 53 is fixed to the rod 52, which arm is bent at right angles at its outer end, as is shown at 53'. On a bolt 55 fixed to the arm 53 a pawl 54 is rockingly mounted which is normally held in the position shown in Fig. 6 by means of a spring 56 connected to the arm 53. A spring 57 connected to the bracket 50 and the arm 53 forces the arm 53 and the parts carried thereby into engagement with the lever 49. The pawl 54 cooperates with a ratchet wheel 271 forming a part of the mechanism for operating the fare indicating disks, and its function will be described hereinafter.

Below the plate 23 a cam 58 is fixed to the shaft 25$^1$, and the said cam is engaged by an arm 60 of a bell crank lever comprising three arms 60, 61 and 62 and mounted on a bolt 59 fixed to the plate 23. The arm 61 is jointed to a bar 63 connected at its opposite end to a lever 69 having its fulcrum at 68, which bar is adapted to be moved in longitudinal direction by means of a bell crank lever 60, 61, 62 upon operation thereof by the cam 58. The bar 63 is formed with a recess 64, a lug 65 and two pins 66 and 67, and it is acted upon by a spring 67' tending to shift the same upwardly and with the arm 60 into engagement with the cam 58. The lever 69 carries a pin 70 and at its end near the fulcrum 68 it is made integral with a toothed segment 71. Further, a lever 72 is rockingly mounted on the lever 69, which lever engages a cam 73 fixed to the plate 23, a spring 75 tending to hold the lever 72 in engagement with the cam 73. Further, a pin 74 is fixed to the end of the lever 72, and the said pin is in engagement with a pawl 309, which will be described hereinafter.

The pin 67 carried by the bar 63 acts on a lever 76, 77 rockingly mounted on a bolt 78 fixed to a plate 80 mounted on pillars 79 secured to the plate 23 (Fig. 10). The lever 76, 77 is in the form of a pawl cooperating with a ratchet wheel 86' forming a part of the mechanism for indicating extra charges. A lug 81 made integral with the lever 76 engages a lever 82 rockingly mounted on a bolt 83 carried by an arm 230. A spring 84 connecting the levers 82 and 76, 77 tends to hold the pawl 77 and the end of the lever 82 in engagement with the ratchet wheel 86'. The said ratchet wheel is secured to a shaft 85 carrying a disk 86 indicating the extra charges, the said disk having been indicated in Fig. 3. A spring 341 attached respectively to the ratchet wheel 86' and the plate 23 tends to return the ratchet wheel and the disk 86 into initial position. The means for operating the mechanism connected with the ratchet wheel 86' will be described hereinafter.

The pin 66 secured to the bar 63 cooperates with a lever 88, 89 having its fulcrum at 87. The upper arm 89 of the said lever is in the form of a pawl, and it is normally held by a spring 90 in engagement with a gear wheel 91. The arm 89 is made integral with a lug 92 which is best shown in Fig. 7.

The lug 65 cooperates with a pawl 95 mounted on a pin 93 and acted upon by a spring 94 tending to move the same into engagement with a gear wheel 159 for locking the same in position, as will be described hereinafter.

The recess 64 of the bar 63 is engaged by one end of a bell crank lever 97, 98 having its fulcrum at 96 and acted upon by a spring 99 tending to rock the same upwardly in Fig. 9 and into contact with the bar 63. The arm 97 of the said bell crank lever carries a pin 101 on which a pawl 100 is mounted. A spring 102 tends to hold the said pawl in engagement with a ratchet wheel 103 forming a part of the mechanism registering the number of the drives.

The bottom end of the arm 98 cooperates with a bell crank lever 105, 106 rockingly mounted at 104 (Figs. 8 and 11). The arm 106 of the said lever is engaged by a pin 108 carried by a pawl 107 loosely mounted on a bolt 109. A spring 110 tends to hold the pawl 107 with its pin 108 in engagement with the arm 106 of the bell crank lever 105, 106. The pawl 107 is adapted for engagement with the ratchet wheel 111 mounted on a shaft 104 and forming a part of the mechanism for recording extra charges, which mechanism will be described hereinafter.

On shafts 112, 113 and 114 mounted in bores of the plates 21 and 23 wheels 115, 116, 117 formed with pairs of teeth and the fare indicating discs 118, 119, 120 indicating units, tenths and hundredths of the fare are mounted (Figs. 3 and 6). The teeth of the wheel 115 cooperate with the pairs of teeth of the wheel 116, and the wheel 115 is provided near its circumference with a pin 115' providing a stop when resetting the said wheel. The rotary movement of the shaft 113 is transmitted, by means of a tooth 121 carried by the disk 119, to the wheel 117, the tooth 121 being adapted for engagement with the pairs of teeth of the said wheel 117. On the shaft 112 the gear wheel 91, on the shaft 113 a cam disk 122, and on the shaft 114 cam disks 123 and 124 are mounted.

The shaft 113 is mounted in its bearings for being shiftable in longitudinal direction, and it carries a conical sleeve 125 located below the plate 23, the said sleeve being best shown in Figs. 6 and 23. The conical part of the sleeve 125 is engaged by the arm 62 of the bell crank lever 60, 61, 62, which arm is adapted to shift the shaft 113 in longitudinal direction against the action of a leaf spring 131 upon operation of the arm 60 by the cam 58. Thereby the teeth of the wheels 115 and 116 are brought out of position for cooperation.

Between the plates 21 and 23 a shaft 126 is rotatably mounted, and to the end of the said shaft projecting from the plate 23 a ratchet wheel 127 and a disk 128 are secured, which disk is adapted to indicate the thousandths of the fare. A coiled spring 129 surrounding the shaft 126 is adapted to return the said shaft and the disk 128 into initial position, which position is determined by a stop pin 130.

Above the plate 23 a cam 132 is fixed to the shaft $25^2$, which shaft is engaged by a roller 134 mounted on a pin 133 fixed to the arm 136 of a lever 136, 137 having its fulcrum at 135 (Figs. 6 and 7), a spring 138 connected to the arm 137 holding the roller in engagement with the said cam 132. When rocking the lever 136, 137 by means of the cam 132 a nose 139 provided on the arm 137 is moved into engagement with the cam disk 123 carried by the shaft 114, whereby the disk 120 is reset. Further, upon such movement of the lever 136, 137 the bottom end of the arm 137 engages a cam face of an arm 140 of a lever 140, 141 having its fulcrum at 142 and normally held by a spring 143 in engagement with a fixed pin 144. When rocking the lever 140, 141 by means of the arm 137 the end of the arm 141 engages the cam disk 122 secured to the shaft 113, thus resetting the disk 119, the teeth of the wheels 115, 116 having been first brought out of position for cooperation by the aforesaid longitudinal displacement of the shaft 113.

On the fulcrum 135 of the lever 136, 137 a bell crank lever 145, 146 is rockingly mounted, the arm 145 of which carries a pin 147 held in contact with the cam disk 124 secured to the shaft 114 by means of a spring 148. On a pin 150 secured to the arm 146 a pawl 149 is mounted, and a spring 151 connected to the said pawl and a fixed pin of the bell crank lever 145, 146 tends to rock the pawl into engagement with the ratchet wheel 127 carried by the shaft 126. In the position of the parts shown in Fig. 6, in which the arm 136 of the lever 136, 137 has been rocked outwardly by the cam 132 the pawl 149 is held out of engagement with the ratchet wheel 127 by means of a pin 152 fixed to the pawl and engaging the adjacent edge of the arm 137. When rocking the lever 136, 137 with the arm 137 inwardly a pin 153 fixed to the said arm engages an arm 154 of a locking pawl 156 mounted on a pin 155 and rocks the same against the action of a spring 157 into the position shown in Fig. 6 in which the pawl 156 is out of locking engagement with the ratchet wheel 127, so that the said wheel is turned by the spring 129 into its end position. The gear wheel 91 secured to the shaft 112 of the disk 110 is in mesh with a gear wheel 159 rotatably mounted on a shaft 158 fixed to the plate 23. The hub 160 of the gear wheel 159 is made hollow to provide a housing for a coiled spring 161 sliding with one end within the hub 160 and attached with its opposite end to the shaft 158. Further, on the shaft 158 a second gear wheel 162 is rotatably mounted, which is in mesh with a pinion 164 secured to a shaft 163 passed through and rotatably mounted in bores of the plates 21 and 23. At its front end the said shaft 163 carries a gear wheel 165 adapted to transmit rotary movement to the numeral wheels 169, 170, 171 and 172 of the registering mechanism 173 adapted to register the total fare through the intermediary of intermediate gear wheels 166, 167 and 168.

To the inner face and at opposite sides of the windows 17 and 18 of the lid 10 plates 174 and 175 are secured on which the odometer mechanism and the apparatus for registering the number of the drives are mounted (Fig. 15). On the uppermost shaft 176 disposed in bores of the said plates the aforesaid registering drums 177, 178 and 179 are rotatably mounted, the said drums being located at the side of the ratchet wheel 103 cooperating with the pawl 100. The rotary movement of the ratchet wheel 103 is directly transmitted to the drum 177, and it is intermittently transmitted by means of intermediate wheels 181 and 182 rotatably mounted on a shaft 180 to the drums 178, 179. Below the shaft 176 two shafts 183 and 184 are rotatably mounted in bores of the plates 174, 175. On the shaft 183 the figure drums 185, 186, 187 and 188, and on the lower shaft 184 the figure drums 189, 190, 191 and 192 are rotatably mounted. The inner drums 185 and 189 are provided at their sides with spur gears 193 and 194 cooperating respectively with gear wheels 203 and 204 mounted on shafts 195 and 196 carrying intermediate gear wheels 197, 198, 199, 200, 201 and 202 of the figure drums as is best shown in Figs. 9 and 15. Further, the plates 174 and 175 provide bearings for a longitudinally shiftable shaft 205 carrying a gear wheel 206 meshing, when in operative position, with the gear wheels 203 and 204. Further, a conical sleeve 207 is fixed to the said shaft. The conical face of the said sleeve is engaged by the arm 98 of the bell crank lever 97, 98, and when rocking the said lever the conical sleeve is pushed laterally, and the shaft 205 is shifted in longitudinal direction against the action of a spring 208 and into position for shifting the gear wheel 206 out of mesh with the gear wheels 203 and 204. The odometer is operated by means of the shaft 209 from a rotary part of the vehicle, for which purpose the said shaft carries a gear wheel 210 (Fig. 22) meshing with a gear wheel 211 secured to the shaft 196 and rigidly connected with the gear wheel 204. Thus the rotary movement imparted from the vehicle to the shaft 209 is transmitted to the drums 189 to 192, which therefore register the total length of way made by the vehicle. If the gear wheel 203 is coupled with the gear wheel 204 by means of the gear wheel 206 mounted on the longitudinally shiftable shaft 205, the rotary movement of the shaft 209 is likewise transmitted to the registering apparatus comprising the drums 185 to 188. Such coupling is effected by means of the arm 98 and when the fare indicator has been set in position for registering passenger trips, so that the drums 185 to 188 register the length of way made by the employed vehicle.

Finally, between the plates 174 and 175 the aforesaid shaft 104 is mounted, which carries the figure drums 213, 214 and 215. The drum 213 is rigidly connected with the ratchet wheel 111 shown in Figs. 8 and 9. The rotary movement imparted to the ratchet wheel 111 by the pawl 107 and to the drum 213 connected therewith is transmitted through intermediate gear wheels 216 and 217 to the drums 214 and 215. The drums 213 to 215 indicate the number of the trips made with an extra charge.

For rotating the ratchet wheel 86' by means of the pawl 82 the following mechanism is provided: To the inner end of the rotary shaft 219 carrying the button 20 a ratchet wheel 220 and a cam disk 221 are secured (Figs. 6, 8 and 15), and the cam disk co-operates with a pawl 224 rockingly mounted on a bolt 222 and acted upon by a spring 223. A pin 227 fixed to one end of a lever 225, 226 is in sliding engagement with the cam 221. On a pin 109 carried by the arm 226 the pawl 107 is mounted. The lever 225, 226 is fixed to one end of a shaft 229 mounted in the plates 21 and 23, and to the opposite end of the said shaft an arm 230 is fixed (Fig. 10), which arm carries the bolt 83 on which the lever 82 is mounted. Thus rotary movement of the button 20 is transmitted to the ratchet wheel 86' and the indicating disk 86 connected therewith, and the dimensions of the elements of the mechanism are such that by one rotation of the button 20 the ratchet wheel 86' and the ratchet wheel 111 registering the extra charges are advanced one step.

In bores of the plates 21 and 23 an arbor 231 is rotatably mounted, and to the outer end of the said arbor projecting through the lid 10 the wing nut 15 is fixed by means of a coupling member 337 (Figs. 14 and 15). On the said shaft the spring barrel 233 is mounted, and within the said barrel there is a spring 232 which is connected at its ends respectively to the arbor and to the barrel. The spur gears 234 provided on the barrel 233 are in engagement with a gear wheel 236 mounted on an arbor 235. A gear wheel 237 mounted on the arbor 235 is in engagement with a pinion 239 secured to an arbor 238, and a gear wheel 240 secured to the said arbor is in engagement with a pinion 242 provided on an arbor 241. On the said arbor a gear wheel 243 is mounted, which is in mesh with a pinion 245 provided on an arbor 244. An escape wheel 246 fixed to the arbor 244 cooperates with a pallet 248 mounted on an arbor 247 and transmitting movement to the balance wheel 250 by means of the usual fork 249. The balance wheel is rotatably mounted on a balance-staff 252 mounted between the plate 21 and a bridge 251 fixed thereto.

At opposite corners the disk 38 carries pins 253 cooperating with a rocker 255 mounted on a shaft 254 and constructed as a stop member, a spring 256 tending to hold the said rocker in the path of the pins 253. On a pin 258 fixed to the outer end of the rocker 255 an arm 257 is mounted the outer end of which is bent at right angles and carries a roller 259. At a part intermediate its ends a nose 260 is bent at right angles from the lever 257. A spring 261 connected respectively to the arm 257 and the rocker 255 pulls the arm 257 towards the rocker 255, the nose 260 being in engagement with the edge of the said rocker. When rocking the rocker 255 by means of the pins 253 carried by the disk 38 the roller 259 of the arm 257 is moved into engagement with the balance wheel 250, which is therefore arrested. When the rocker 255 and the arm 257 are returned into the position shown in Fig. 14 the balance wheel is again released, so that the work of the clock continues its movement.

Further, the spur gears 234 of the spring barrel 233 are in mesh with a gear wheel 263 fixed to the arbor 262. On the said arbor there is a second gear wheel 263', which is in mesh with a gear wheel 265 loosely mounted on a shaft 264 (Figs. 14 and 16). The shaft 264 is rotatably mounted in bores of the plate 21 and a bridge 266 fixed to the plate 23.

Referring now more particularly to Figs. 16 to 19, the gear wheel 265 is formed with a concentric slot 267 having a length corresponding substantially to an angle of from 5 to 10°, the length of the said slot being adjustable by means of an annular slide fixed to the wheel by means of screws 268. At the side of the wheel 265 a ratchet wheel 271 having small ratchet teeth is loosely mounted on the shaft 264, which ratchet wheel carries a pin 270 projecting into the slot 267. The ratchet wheel 271 is made integral with a gear wheel 272 which carries at its side four pawls 274 mounted on pins 273. Springs 275 fixed to the wheel 272 tend to hold the said pawls in engagement with a ratchet wheel 276 fixed to a hub 277 keyed to the shaft 264. To the opposite end of the said hub 277 another ratchet wheel 278 is fixed the teeth of which are engaged by pawls 279 carried by the worm gear 280 which therefore is adapted to rotate the said ratchet wheel in one direction only. As is shown in Fig. 19, the wheels 276 and 278 have very small and close ratchet teeth. The worm gear 280 is loosely mounted on the shaft 264, and it is in mesh with the worm 281 by means of which rotary movement is imparted thereto from a rotary part of the vehicle, as will be described hereinafter. The ratchet wheel 271 is adapted to be engaged by the pawl 54 mounted on the arm 53, and when moving the said pawl downwardly by means of the lever 49 it turns the said ratchet wheel in the direction of the arrow $x$ shown in Fig. 17 and through an angle corresponding to the length of the slot 267.

The worm gear 280 is in mesh with a pinion 283 rotatably mounted on a bolt 282 fixed to the plate 21, and the said pinion is likewise in engagement with a gear wheel 285 fixed to a shaft 284. Further, a gear wheel 286 is rotatably mounted on the said shaft 284. A spring 287 coiled around the shaft 284 presses the gear wheel 286 on a stop disk 288 fixed to the shaft 284. The gear wheel 286 is in engagement with the gear wheel 272.

To the shaft 264 a disk 289 is fixed. A pin 290 fixed to the said disk projects into a slot 291 made in a ratchet wheel 292 loosely mounted on the hub of the disk 289, the length of the said slot corresponding substantially to an angle of from 5 to 10°, and the length of the said slot can be varied by means of an annular slide 212. A spring 218 connected respectively to the ratchet wheel 292 and the pin 290 turns the ratchet wheel 292 into the position shown in Fig. 18 when the indicator is out of operation.

On a bolt 295 fixed to the plate 23 a bell crank lever 293, 294 is mounted. On a pin 296 fixed to the arm 293 of the said lever a pawl 297 is rockable, which is acted upon by a spring 299 attached to a pin 298 and holding the pawl in engagement with a pin 300 fixed to the plate 23. A spring 302 connected respectively to a bolt 301 mounted on the plate 23 and to the pin 298 of the arm 293 presses the arm 294 into engagement with the pin 70 of the lever 69. On the bolt 295 an arm 303 is rockable which is formed with a toothed segment 304 engaging in the toothed segment 71 of the lever 69. On a pin 305 fixed to the arm 303 a pawl 306 is mounted which is acted upon by a spring 307 holding the same in engagement with the teeth of the ratchet wheel 292. The arm 294 carries a bolt 308 on which the pawl 309 is rockingly mounted which is adapted for cooperation with the gear wheels 159 and 162. Further, the pawl 309 is formed with a notch 310 engaged by the pin 74 of the lever 72. When rocking the lever 293, 294 with its arm 294 upwardly the pawl 309 gets into engagement with the gear wheels 159 and 162.

The shaft 6 connected with the rotary part of the vehicle is coupled by means not shown in the figures with the gear wheel 312 mounted on a bracket 311 (Figs. 6 and 27). The gear wheel 312 is in engagement with a gear wheel 313 meshing with two gear wheels 316 and 317 of even diameter and mounted respectively on shafts 314 and 315. Each of the said gear wheels 316 and 317 carries a pawl 320 and 321 mounted respectively on pins 318 and 319, and the said pawls are held in engagement with ratchet wheels 324 and 325 by springs 322 and 323, which ratchet wheels are formed with oppositely cut ratchet teeth. At the opposite side of the bracket 311 interengaging gear wheels 326 and 327 are mounted on the shafts 314 and 315, and the gear wheel 326 carries two pins 328 coupling the same with a flange 330 secured to a shaft 329 (Figs. 13 and 15). The shaft 329 is mounted on the brackets 50 and 51, and it carries the spur gear 331 meshing with the crown gear 332 mounted on the shaft 209 rotatable on a bracket 333 fixed to the lid 10. A gear wheel 334 secured to the shaft 329 is in engagement with a gear wheel 335 keyed to a shaft 336 rotatably mounted on the brackets 50 and 51 (Fig. 13). To the shaft 336 the worm 281 is secured, which is in mesh with the worm gear 280. Thus the rotation of the shaft 6 can be transmitted by means of the shaft 209 to the odometer and by means of the worm gearing 281, 280 to the fare indicating disks.

The operation of the fare indicator is as follows:

The handle 13 and its flag 16 can be set at angles of 0°, 90°, 180° and 270°, and for rocking the same from the 0° position a locking mechanism must be first released. The rocking movement of the handle 13 and the shaft 25 in the direction of the arrow z shown in Fig. 21 is normally prevented by the pawl 32 engaging in the notch 27 of the disk 29. For releasing the said locking mechanism the handle 13 and the shaft 25 are slightly rocked in a direction opposite to the arrow z. Thereby the pawl 32 is rocked outwardly, and the locking pawl 37 is rocked into position for engagement with the notch 28, so that the pin 34 makes contact with the outer edge of the heel 33 thus holding the pawl 32 in retracted position. Now the disk 29 and the shaft 25 can be turned in the direction of the arrow z and into fare indicating position corresponding to the 90° position of the flag 16.

When rocking the shaft 25 at an angle of 90° the parts of the indicator are set into operative positions as follows:

I. The cam 58 releases the bell crank lever 60, 61, 62, so that the bar 63 is moved upwardly.

(a) Thereby the lever 97, 98 and the pawl 100 are released and rocked by the spring 99 into the position shown in Fig. 9, the pawl 100 being advanced one step relatively to the ratchet wheel 103, so that it is capable to turn the said ratchet wheel and the mechanism registering the number of the drives through an angle corresponding to one figure upon the next downward movement of the bar 63. By the rocking movement of the arm 98 the bell crank lever 105, 106 is released, so that the pawl 107 is thrown into engagement with the ratchet wheel 111.

(b) Further, upon upward movement of the bar 63 the lug 65 releases the pawl 95, which is rocked by its spring 94 into engagement with the gear wheel 159 and locks the same as against return movement under the action of the coiled spring 161.

(c) The pin 66 moving upwardly with the bar 63 releases the lever 88, 89 which is therefore rocked by its spring 90 into engagement with the gear wheel 91 and locks the same as against return movement.

(d) The pin 67 releases the lever 76, so that the pawl 77 and the lever 82 are brought into engagement with the ratchet wheel 86'.

(e) Finally, the bar 63 carries along the lever 69 which is rockingly mounted at 68. Therefore the pin 70 releases the arm 294 of the bell crank lever 293, 294, so that the pawls 297 and 309 get into engagement respectively with the ratchet wheel 292 and the gear wheels 159, 162. The lever 72 releases the pawl 309 and gets into contact with the cam 73, as is shown in Fig. 7. Simultaneously the arm 303 is rocked by means of the toothed segments 71 and 304 thus throwing the locking pawl 306 into locking engagement with the ratchet wheel 292.

II. By the rocking movement of the bell crank lever 60, 61, 62 the arm 62 releases the conical sleeve 125, so that the shaft 113 is shifted by the leaf spring 131 in longitudinal direction, and one of the pairs of teeth of the wheel 116 is thrown into engagement with one of the teeth of the wheel 115.

III. By the rotation of the shaft 25 the cam 44 releases the arm 46 of the lever 46, 47, so that the lever 49 is rocked upwardly in Fig. 15 and releases the rod 52. The said rod and the arm 53 carried thereby and having the pawl 54 mounted thereon are elevated by the spring 57, so that the pawl 54 releases the gear wheel 271.

IV. Further, by the rocking movement of the shaft 25 the cam 132 releases the lever 136, 137, which is therefore rocked by the spring 138, so that the nose 139, the pin 153 and the arm 137 release respectively the cam disk 123, the arm 154 and the lever 140, 141. Therefore the locking pawl 156 is thrown into engagement with the teeth of the ratchet wheel 127. Further, the cam disk 122 is released from the lever 141. By the rocking movement of the arm 137 the pin 152 of the pawl 149 is released, so that the said pawl engages in the teeth of the ratchet wheel 127. The pin 147 of the lever 145, 146 gets into engagement with the cam disk 124.

V. Further, by the rotation of the shaft 25 the pin 253 releases the rocker 255 which is rocked by the spring 256 from the position shown in Fig. 20 into the position shown in Fig. 14. The rocker 255 carries along the arm 257 which therefore releases the balance wheel 250, so that the clockwork begins to run.

VI. When the flag 16 and the shaft 25 arrive in one of the said four positions the roller 40 and the spring-pressed lever 42 engage in the corresponding notch 39 of the disk 38, whereupon the shaft 25 and the parts controlled thereby are arrested in the positions corresponding to the desired indication of the fare.

If now after thus preparing the fare indicator the vehicle is started the movement of a rotary part of the vehicle such as one of the wheels is transmitted by means of the shaft 6 and the gearings 312 to 336 to the worm 281 and the worm gear 280. By reason of the reversing mechanism consisting of the gear wheels 316 and 317, the ratchet wheels 324 and 325, and the pawls 320 and 321 the rotary movement of the shaft 6 is transmitted so that the worm 281 rotates in the same direction whether the vehicle drives forwardly or backwardly.

While the movement of the vehicle is transmitted to the worm gear 280, the rotation of the spur gears 234 of the spring barrel 233 is transmitted to the gear wheel 265, which is mounted on the shaft 264 carrying the worm gear 280. The movement of the worm gear 280 connected with the vehicle wheel and the movement of the gear wheel 265 connected with the clock-work are transmitted to the ratchet wheel 292 connected with the driving mechanism of the fare indicating disks in the manner to be described hereinafter. By reason of the slots 267 and 291 of the gear wheels 265 and 292 the said driving mechanism is not started immediately after starting the clock-work and the vehicle, but only after the vehicle has made a certain way or the clock-work has run a certain length of time. Therefore, during the initial way of the vehicle and the initial movement of the clock-work measuring the time the driver has been waiting the fare indicating disks 118, 119 and 120 remain in their initial positions in which they indicate the minimum charge. By shifting the segmental slides 269 and 212 determining the length of the slots 267 and 291 the initial movement of the mechanism and therefore the initial length of way and period of time and further the ratio of the said length of way and period of time can be changed at will.

The driving mechanism of the fare indicating disks is operated as follows:

(a) Operation by the driving vehicle:

When setting the handle 13 into zero position at the end of a drive the ratchet wheel 271 is turned by the pawl 54 in the direction of the arrow x shown in Fig. 17 so far that the pin 270 is in the position shown in Fig. 17. If now a new trip begins the worm gear 280 is rotated, and during the first part of the rotary movement of the said worm gear the pin 290 moves through the slot 291 of the ratchet wheel 292, until it makes contact with the end of the annular slide 212, and by the said movement the spring 218 is put under tension. In this part of the operation of the mechanism, which corresponds to the initial length of way of the vehicle, the mechanism is directly connected with the indicating disks 118, 119 and 120 and therefore the said disks themselves remain in their initial positions, and the disks indicate the minimum fare. When the pin 290 makes contact with the slide 212 and further rotary movement of the wheel 280 is transmitted to the ratchet wheel 292 the ratchet wheel acts on the pawl 297 (Fig. 24) and imparts a slight rocking movement to the bell crank lever 293, 294 whenever the pawl drops from the end of a tooth into the adjacent space. Thus the pawl 309 is reciprocated so as to advance the gear wheels 159 and 162 a distance corresponding to two consecutive teeth. The intermittent movement of the wheels 159 and 162 is transmitted from the wheel 159 and through the intermediary of the wheel 91 to the disk 118, and through the intermediary of the gear wheel 164 carried by the shaft 163 to the registering mechanism 173 registering the total fare. The teeth of the gear wheels 115, 116 and 117 are spaced from one another so far that only after several intermittent movements of one wheel the disk indicating the higher values is advanced a distance equal to the distance between two pairs of teeth.

While the pin 290 of the disk 289 operated by the worm gear 280 passes through the slot 291 of the ratchet wheel 292, the rotation of the worm gear 280 is simultaneously transmitted, by the pinions 283, 285 and the gear wheel 286 connected with the pinion 285 by frictional coupling means 287, to the gear wheel 272. The worm gear 280 rotates in anti-clockwise direction. Therefore the gear wheel 272 driven from the said worm gear through the intermediary of the gear wheels 283, 285 and 286 rotates in clockwise direction, while the pin 270 passes through the slot 267 of the gear wheel 265. When the pin 270 has made contact with the annular slide 269 of the gear wheel 265 connected with the clock-work the frictional connection between the gear wheel 286 and its shaft 284 yields so that the worm gear 280 and the gear wheels 283 and 285 continue their rotary movement without being affected by the gear wheel 272 which is now at rest or slowly rotated by the clockwork. By providing the gearing 283, 285 and 286 rotating the gear wheel 272 backwardly the retarding action of the slot 267 is prevented if the vehicle is stopped with the fare indicator in operative position after driving through a length of way larger than that corresponding to the length of the slot 267. Therefore, when the car is stopped after making a drive the mechanism connected with the fare indicating disks is immediately driven from the clock-work.

(b) Operation with the vehicle stopping:

After the gear wheel 271 has been turned by the pawl 54 so far that the pin 270 is in the position shown in Fig. 17 relatively to the slot 267 of the gear wheel 265, and after the fare indicator has been set into operative position by turning the handle 13, the operating mechanism of the fare indicating disks is driven from the clock-work. The fare indicating disks display the minimum charge, and the wheel 265 driven from the clock-work rotates at first through an angle corresponding to the length of the slot 267, before it carries along the gear wheel 271 by means of the pin 270 connected with the shaft 264 by means of the pawls 274 and the wheel 276. Now the disk 289 is started. At first the disk 289 must rotate through an angle corresponding to the length of the slot 291 before it carries along the ratchet wheel 292 by means of the pin 290. Now the driving mechanism of the fare indicating disks can be rotated in the manner described above. It appears therefore that while the car is waiting without having first made a drive the dead way corresponding to both slots 267 and 291 must be passed. Therefore the initial period of time of waiting during which the fare indicating disks display the minimum charge is about the double of the time required for the driving vehicle to pass through the initial length of way. When the vehicle is started the ratchet wheel 292 is immediately driven from the vehicle, and there is no pause in the movement of the worm gear 280.

By the upward movement of the bar 63 the conical sleeve 207 is released from the arm 98 of the lever 97, 98. Therefore the gear wheel 206 is coupled with the gear wheels 203 and 204 by means of the spring 208, so that the movement of the wheel 331 driven from the vehicle is transmitted to the odometer through the intermediary of the crown gear 332 and the shaft 209.

For setting an extra charge on the disk 86 the button 20 is turned the rotary movement of which is transmitted by means of the cam 221 and the lever 225 to the shaft 229, the pin 227 carried by the lever 225 dropping from the part of large radius of the cam on the part of small radius. The rocking movement of the shaft 229 is transmitted by means of the arm 230 to the pawl 82, by means of which the ratchet wheel 86' and the disk 86 indicating the extra charges are operated (Fig. 10).

Simultaneously the movement of the button 20 is transmitted by the arm 226 to the pawl 107, which pawl advances the mechanism registering the number of the trips on which an extra charge is raised one step. Return movement of the button 20 is made impossible by means of the locking pawl 224 engaging in the ratchet wheel 220.

In the construction of the apparatus shown in the drawings the operative positions of the indicator correspond to the 90° and 270° positions of the flag 16, while the 0° and the 180° positions of the said flag correspond to the inoperative positions of the fare indicator.

When rocking the flag into the 0° position shown in Fig. 1 for throwing the indicator out of operation, the arm 60 of the bell crank lever 60, 61, 62 is raised by means of the cam 58. The arm 62 is thrown into engagement with the conical sleeve 125 thus shifting the shaft 113 into the position in which the teeth of the wheel 116 are out of engagement with the teeth of the wheel 115. The fare indicating disk 119 is reset by means of the lever 141 acting on the cam disk 122.

By the downward movement of the bar 63 connected with the arm 61 the following operations are performed:

I. The pawl 100 is moved so as to advance the ratchet wheel 103 and the drums 176 carried thereby one step.

II. The locking pawls 95 and 89 are retracted out of engagement with the gear wheels 159 and 91, so that the wheel 159 and the disk 118 are returned into the zero position by the spring 161, the said zero position being determined by the pin 115' fixed to the gear wheel 115 and making contact with the lug 92 of the lever 89.

III. By the pin 67 and the nose 81 the levers 76, 77 and 82 are thrown out of engagement with the ratchet wheel 86', so that the disk 86 showing the extra charge is reset by the spring 341.

IV. Finally, by means of the pin 70 the bell crank lever 293, 294 is rocked so that the pawl 297 gets out of engagement with the teeth of the ratchet wheel 292. By means of the toothed segments 71 and 304 of the lever 69 and the arm 303 the locking pawl 306 is retracted away from the teeth of the ratchet wheel 292, so that the mechanism of the fare indicating disk is disconnected from the ratchet wheel 292.

V. By being rocked downwardly the lever 69, the arm 72 jointed thereto and the pin 74 carried by the said arm retract the pawl 309 from the gear wheels 159 and 162.

By the rocking movement of the lever 136, 137 imparted thereto by the cam 132 the fare indicating disk 120 is reset, the nose 139 resetting the cam disk 123 connected with the said indicating disk. Simultaneously the pawls 149 and 156 are retracted away from the teeth of the ratchet wheel 127, so that the disk 128 is reset by the spring 129 fixed to its shaft 126.

Further, by the return movement of the flag 16 the cam 44 elevates the lever 46, the movement of which is transmitted through the arm 49 and the rod 52 to the pawl 54, which causes the return movement of the gear wheel 271 through an angle corresponding to the length of the slot 267.

The pin 253 carried by the disk 38 rocks the rocker 255, by means of which the arm 257 is moved downwardly and with the roller 259 into engagement with the balance wheel 250 of the clock-work, so that the clock mechanism is stopped.

By the said resetting operations the figures displayed by the disks 118, 119, 120 and 128 are removed from their peep holes, so that the indicating apparatus is ready for registering the fare of the next trip.

The clock mechanism is wound by means of the wing nut 15.

The resetting operation of the mechanism does not act on the registering mechanisms displaying the figures through the peep holes 17, 18 and 19 of the lid, so that at the end of the day the sum of the fares, the number of the trips, the length of way made by the employed vehicle, the total length of way made by the vehicle and the number of the trips for which an extra charge is made are registered.

While in describing the invention reference has been made to a particular example embodying the same I wish it to be understood that my invention is not limited to the construction shown in the drawings, and that various changes may be made in the general arrangement of the apparatus and the construction of its parts without departing from the invention.

I claim:

1. In a fare indicator, the combination, with the fare indicating members, resetting means therefor, and mechanism for registering the total fare, of a rotary driving shaft adapted to be connected with a rotary part of the vehicle and connected with said fare indicating members, motion transmitting mechanism intermediate said registering mechanism and said rotary driving shaft and including a driven shaft in the plane of said driving shaft, a crown wheel carried by said driven shaft, and a spur gear mounted on said driving shaft in mesh with said crown wheel for operatively connecting said shafts, said spur gear having an extended axial length whereby the location of said shafts relatively to each other in the direction of the axis of said driving shaft may be varied within the axial length of said spur gear without disconnecting the latter from said crown wheel.

2. In a fare indicator, the combination, with the fare indicating members, of mechanism for registering the total fare comprising two sets of registering members, of a setting member for setting the indicator into and out of operative positions, a gear wheel and its shaft adapted to connect and disconnect said sets of registering members, a conical sleeve fixed to said shaft, and an arm connected with said setting member and acting on said conical sleeve for shifting said gear wheel into disconnecting position.

3. In a fare indicator, the combination, with the indicating members, of driving mechanism therefor adapted to be operated by a rotary part of the vehicle and comprising a driving member and a driven member having dead movement, and a clock-work connected with said driving member and having dead movement relatively thereto.

4. In a fare indicator, the combination, with the indicating members, of driving mechanism therefor adapted to be connected with a rotary part of the vehicle and including driving and driven members having pin and slot connection with each other, and a clock-work having pin and slot connection with said driving member.

5. In a fare indicator, the combination, with the fare indicating members, of mechanism adapted to be connected with a rotary part of the vehicle for moving said members, time controlled mechanism operatively connected with said members, and means including a friction clutch intermediate said mechanisms, whereby said time-controlled mechanism may be operated by said first mentioned mechanism to be automatically set thereby.

6. In a fare indicator, the combination, with the fare indicating members, of mechanism adapted to be connected with a rotary part of the vehicle for moving said members, time controlled mechanism operatively connected with said members, said mechanisms comprising coaxial gear wheels, a pair of pinions mounted on a common shaft and one in frictional engagement therewith and meshing with said gear wheels.

7. In a fare indicator, the combination, with the indicating members, of driving mechanism therefor adapted to be operated by a rotary part of the vehicle and comprising a driving member and a driven member having dead movement, time controlled mechanism connected with said driving member and having dead movement relatively thereto, and mechanism connected with said driving mechanism for moving said time controlled mechanism through said dead movement.

8. In a fare indicator, the combination, with the indicating members, of driving mechanism therefor adapted to be connected with a rotary part of the vehicle and including driving and driven members having pin and slot connection with each other, time controlled mechanism having pin and slot connection with said driving member, and means controlled by said driving mechanism for moving said time controlled mechanism a distance corresponding to said dead movement.

9. In a taximeter, the combination with a flag having a plurality of significant positions, ratchet wheel operated fare-register mechanism under the control of the flag shaft, a cumulating shaft for operating the ratchet wheel, distance responsive mechanism for operating the cumulating shaft in a forward direction only, and a time train for operating the cumulating shaft, said time train including a one way clutch and a device for delaying the driving of the cumulating shaft thereby after the flag is moved to the running position until predetermined conditions have been brought about by lapse of time or movement of the vehicle, of means for resetting the delaying device independent of vehicle movement, said means including flag shaft operated ratchet and pawl mechanism for turning the ratchet wheel and cumulating shaft forward, whereby the clutch is carried bodily forward against a stop carried by the driving portion of the time train.

In testimony whereof I hereunto affix my signature.

PAUL RIEGGER.